United States Patent [19]
Jones et al.

[11] Patent Number: 5,736,086
[45] Date of Patent: Apr. 7, 1998

[54] PROCESS FOR FORMING LAYERED STRUCTURE OF METAL SHEET AND POLYESTER

[75] Inventors: Allan S. Jones, Church Hill; Richard L. McConnell; James W. Mercer, Jr., both of Kingsport, all of Tenn.

[73] Assignee: Eastman Chemical Company, Kingsport, Tenn.

[21] Appl. No.: 625,790

[22] Filed: Mar. 29, 1996

Related U.S. Application Data

[63] Continuation of Ser. No. 311,630, Sep. 23, 1994, abandoned.

[51] Int. Cl.$^6$ .................................................. B29C 47/06
[52] U.S. Cl. ............... 264/171.17; 428/458; 264/171.22; 264/173.1
[58] Field of Search ............ 148/171.17, 177.22; 428/458

[56] References Cited

U.S. PATENT DOCUMENTS

| | | |
|---|---|---|
| 3,589,975 | 6/1971 | Andrews et al. |
| 4,143,790 | 3/1979 | Ueno et al. ................... 220/458 |
| 4,352,925 | 10/1982 | Petke et al. |
| 4,450,977 | 5/1984 | Colburn et al. |
| 4,452,374 | 6/1984 | Hitchcock et al. |
| 4,452,375 | 6/1984 | Marcus. |
| 4,810,321 | 3/1989 | Wank et al. |
| 5,149,389 | 9/1992 | Heyes et al. |
| 5,384,354 | 1/1995 | Hasegawa ...................... 428/458 |
| 5,385,788 | 1/1995 | Charleston ..................... 428/458 |
| 5,407,702 | 4/1995 | Smith et al. ................... 427/211 |

FOREIGN PATENT DOCUMENTS

| | | |
|---|---|---|
| 0 067 060 | 12/1982 | European Pat. Off. |
| 0 312 304 | 4/1989 | European Pat. Off. |
| 0 457 423 A2 | 11/1991 | European Pat. Off. |
| 0 493 133 A2 | 7/1992 | European Pat. Off. |
| 15 04 109 | 2/1969 | Germany. |
| 55-166247A | 12/1980 | Japan. |
| 59-176040 | 10/1984 | Japan. |
| 1301317A | 12/1989 | Japan. |
| 2047050 A | 2/1990 | Japan. |

OTHER PUBLICATIONS

Patent Abstracts of Japan, vol. 17, No. 336 (M–1435), Jun. 25, 1993 (JP A 05 042650).
Derwent Abstract AN 90–095333, Week 9013 (JP A 02 047 050).
Derwent Abstract AN 81–16177d, Week 8110 (JP A 55 166 247).
Derwent Abstract WPI Acc. No. 68–21756Q/00 (DE 15 04 109, referenced above).
Patent Abstracts of Japan, vol. 9, No. 264 (M–423), Oct. 22, 1985 (JP A 60 112493).
Patent Abstracts of Japan, vol. 16, No. 466 (C–0989), Sep. 28, 1992 (JP A 04 164930).

*Primary Examiner*—Sam Silverberg
*Attorney, Agent, or Firm*—Cheryl J. Tubach; John F. Stevens; Harry J. Gwinnell

[57] ABSTRACT

Disclosed is a process for forming a layered structure of metal sheet and polyester by heating the metal sheet, extrusion coating a thin layer of polyester on at least one side of the metal sheet, passing the coated sheet through nip rolls and optionally quenching the coated sheet to ensure the polyester coating(s) is in an amorphous state.

8 Claims, 1 Drawing Sheet

PROCESS FOR FORMING LAYERED STRUCTURE OF METAL SHEET AND POLYESTER

This is a continuation of application Ser. No. 08/311,630 filed on Sep. 23, 1994 now abandoned.

TECHNICAL FIELD

The present invention relates to a process for forming a layered structure of metal sheet and polyester by heating the metal sheet, extrusion coating a thin layer of polyester on at least one side of the metal sheet, passing the coated sheet through nip rolls and optionally quenching the coated sheet to ensure the polyester coating(s) is in an amorphous state.

BACKGROUND OF THE INVENTION

Current processes for making food and beverage cans include the application of organic solvent based coating compositions to steel or aluminum cans manufactured by the draw-redraw (DRD) method or the drawn and wall-ironed method (DWI). Because of solvent pollution problems, this type of process is currently quite undesirable. Another process involves the lamination of preformed cast films or biaxially oriented films with aluminum or steel can stock and then subsequently making cans by the DWI or DRD procedure. It would be highly desirable if this multistep process could be abbreviated by in-line extrusion coating of aluminum or steel can stock with polyester materials having good adhesion, barrier and heat seal properties.

U.S. Pat. Nos. 4,452,374, 4,452,375 and 4,450,977 describe the manufacture of draw-redraw cans made by using film laminated or extrusion coated steel sheet material using olefin copolymers or polyolefin graft copolymers. Polyester materials which have better performance characteristics generally cannot be extrusion coated by the procedures described in these patents because of inadequate melt strength.

U.S. Pat. No. 5,149,389 describes the lamination of certain polyester preformed cast films or biaxially oriented films with aluminum or steel can stock for preparation of cans by the DWI procedure.

U.S. Pat. No. 4,352,925 describes heat-resistant adhesive compositions based on poly(ethylene terephthalate) copolyesters containing 30–50 mol % diethylene glycol and discloses that they may be coated on various substrates including metals. However, this patent does not disclose the use of these copolyesters in the continuous extrusion coating of one or both sides of aluminum or steel can stock for the purpose of making cans.

U.S. Pat. No. 3,589,975 discloses that extrusion coating is one method for depositing a film onto metal to be used for can manufacturing.

Japanese Patent 2,047,050A describes the extrusion coating of many types of polymers (of which polyesters are one) onto sheets or foils of aluminum or treated steels.

Japanese Patent 1,301,317A describes the extrusion coating of poly(ethylene terephthalate) onto electrolytically chrome coated steel (0.2 mm thick) at 200 m/min.

Japanese Patent 59,176,040 describes the extrusion coating of poly(butylene terephthalate) onto aluminum.

Japanese Patent 55,166,247A describes the extrusion coating of various polyesters including poly(ethylene terephthalate), poly(butylene terephthalate), poly(1,4-cyclohexylenedimethylene terephthalate) and poly(ethylene isophthalate-co-terephthalate) onto various substrates. The substrates described are biaxially oriented film, paper, aluminum foil, or a combination of the substrates. The focus of the patent is not on the coating of a metal substrate for can making, but on the coating of a flexible substrate for other packaging applications.

U.S. Pat. No. 4,810,321 describes the extrusion coating of polymers onto polyurethane coated metals.

European Patent 493,133A2 describes the extrusion coating of copolyesters onto steel. The metal/plastic laminate can then be used to make food or beverage cans.

European Patent 457,423A2 describes the extrusion coating of poly(ethylene isophthalate-co-terephthalate) copolyesters onto steel. The laminates can then be made into food or beverage cans by the draw-redraw method.

DESCRIPTION OF THE INVENTION

This invention is concerned with a continuous extrusion process for coating one or both sides of metal can stock. The coated can stock is subsequently converted into cans by means of either the DRD or DWI process. Such cans are useful as containers for beverages, food and the like. Typical metals used for the manufacture of cans include aluminum, steel, tin coated steel, zinc coated steel, nickel coated steel, chrome coated steel and the like.

According to this invention, there is provided a process for forming a layered structure of metal sheet and polyester comprising (A) directing a continuous length of metal sheet along a path extending in a downward, generally vertical direction, (B) coating at least one side of said sheet with a layer of molten polyester having repeat units from a dicarboxylic acid component comprising at least 80 mol % terephthalic acid, naphthalenedicarboxylic acid, 1,4-cyclohexanedicarboxylic acid or mixtures thereof and repeat units from a glycol component comprising at least 80 mol % ethylene glycol, diethylene glycol, 1,4-cyclohexanedimethanol or mixtures thereof, (C) prior to the coating step (B), heating the metal sheet to a temperature of about 150° C. to about 350° C., (D) immediately following the coating step (B), passing the coated metal sheet through a pair of cooperating nip rolls adjusted to firmly press the polyester into contact with said metal sheet, and (E) following step (D), optionally quenching the layered structure to a temperature below the glass transition temperature of the polyester to thereby ensure that the polyester coating is in an amorphous state.

BRIEF DESCRIPTION OF THE DRAWINGS

The process according to the present invention is illustrated in the drawing, wherein In FIG. 1, flexible metal sheet material 10 is unwound on a continuous basis from roll 12 and directed along a path in a generally vertical direction. The sheet material is first passed through a heater 14, shown in the drawing as a pre-heating block. Heater 14 heats the material 10 to a temperature of between about 150° C. and about 350° C. Next, sheet material passes between die lips 16 and 18 of extruders 20 and 22 respectively which are positioned to extrude molten polyester onto the surface of sheet material 10 to form coatings 24 and 26 thereon. Of course, if a coating is only desired on one side, one of the extruders can be eliminated. The sheet material 10 is then passed through a pair of cooperating nip rolls 28 and 30 which are adjusted such that the nip is sufficiently close to firmly press the polyester into contact with the surface of sheet material 10. If desired, a second set of nip rolls 32 and 34 can be used to ensure good contact between the coatings and sheet material. It is also preferred that another heater 35 be used. The coated sheet material 10 is then quenched to a temperature below the glass transition temperature of the polyester coating to ensure that they are in an amorphous state. The coated sheet material is then taken up on roll 38. Quenching conveniently is accomplished by taking the coated sheet material through a water bath 36 at about 1°–60° C., preferably 10°–40° C.

Figure 1:
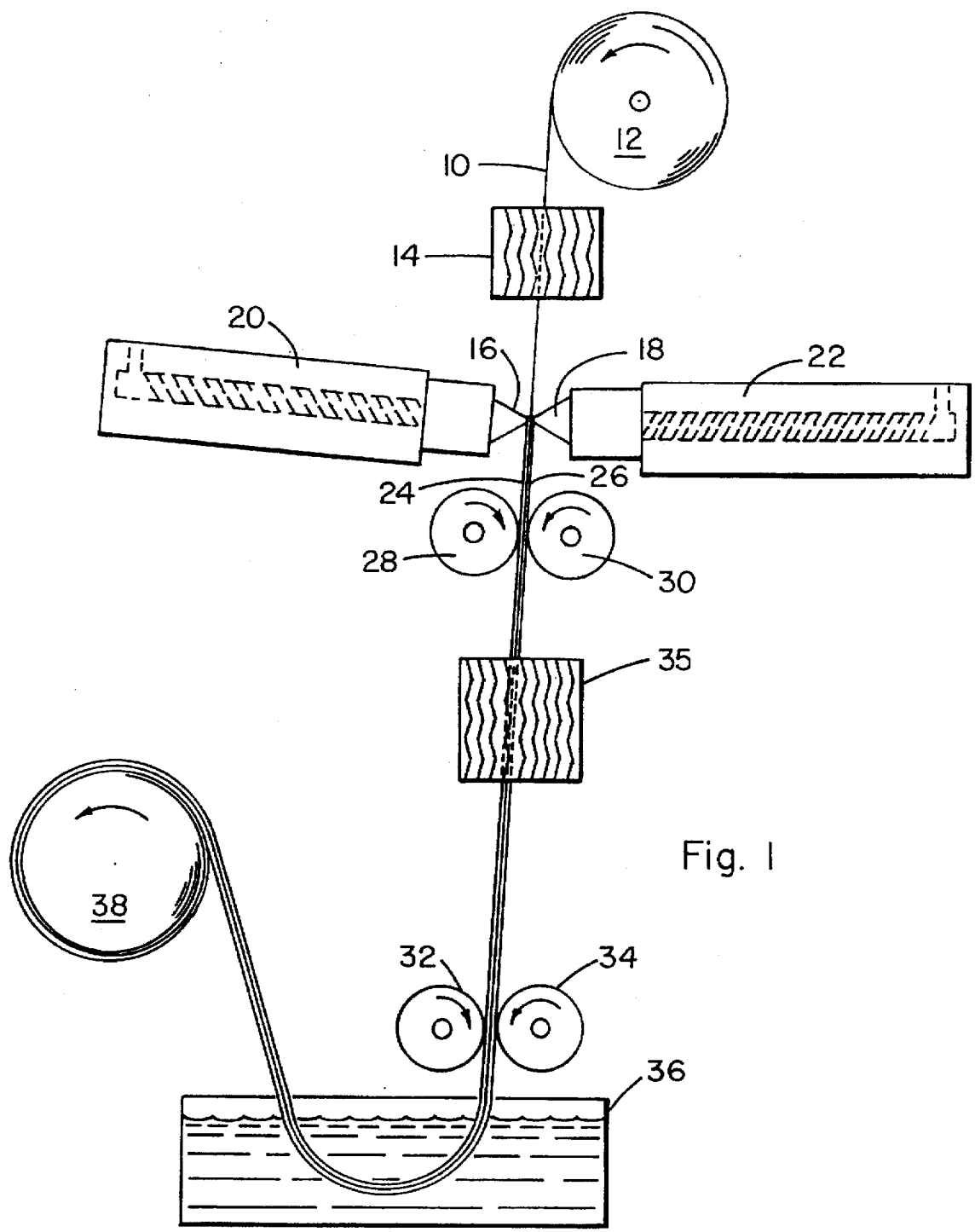
FIG. 1 is a schematic elevation view.

The preferred polyesters are those based on terephthalic acid, naphthalenedicarboxylic acid or 1,4-cyclohexanedicarboxylic acid with ethylene glycol, diethylene glycol or 1,4-cyclohexanedimethanol or mixtures of these components. The naphthalenedicarboxylic acid used is generally the 2,6 isomer but the 1,4-, 1,5-, or 2,7-naphthalenedicarboxylic acids or mixtures of these acids are also useful. These naphthalenedicarboxylic acids may also contain up to about 25 mol % of other isomers such as the 1,2-, 1,3-, 1,6-, 1,7-, 1,8-, 2,3-, 2,4- 2,5-, or 2,8- isomers.

In addition to the primary dibasic acids described above, other suitable modifying dibasic acids containing about 4 to about 36 carbon atoms may be present. Such modifying dibasic acids include fumaric, succinic, adipic, glutaric, azelaic, sebacic, isophthalic, sodiosulfoisophthalic and the like.

The preferred polyesters may also contain modifying amounts of other glycols containing from about 3 to about 12 carbon atoms and may be aliphatic or cycloaliphatic in nature. Suitable modifying glycols include 1,3-propanediol, 1,4-butanediol, 1,5-pentanediol, 1,6-hexanediol, 2,2-dimethyl-1,3-propanediol, 1,10-decanediol, 2,2,4,4-tetramethyl-1,3-cyclobutanediol and the like.

The polyesters are readily prepared by melt phase or solid state polycondensation procedures well known in the art. Useful polymers have inherent viscosity (I.V.) values in the range of about 0.7 to about 1.5 dL/g. Polyesters useful in this invention will generally have crystalline melting points in the range of about 100° C. to about 290° C. or be amorphous polymers with glass transition temperatures greater than about 100° C.

The thickness of the metal used to make cans is about 0.05 to about 0.5 mm for steel and about 0.02 to about 0.5 mm for aluminum can stock. In the process of this invention, the metal sheeting is heated to a temperature of about 150° C. to about 350° C. by means of a gas flame, infrared, induction heating or other suitable heating method and passed to lamination rolls as shown in FIG. 1. Just prior to the lamination rolls, one or two layers of polyester melt is extruded onto one or both sides of the preheated metal strips. The melt temperature of the polyesters is at least as high as the crystalline melting point of the polymer and generally will be at least as high as about 250° C. The polymer coating thickness on one or both sides of the metal sheeting will generally be in the range of about 0.5 to about 3.0 mil. When one layer of polyester is applied, the polyester of choice is usually a copolyester having particularly good adhesion to metal. One such example is a poly(ethylene terephthalate) copolyester containing about 10 to about 40 mol % diethylene glycol. Also such copolyesters modified with about 0.5 to about 5.0 mol % 5-sodiosulfoisophthalic acid are highly suitable. When two layers of polyester are applied to each side of the metal sheeting, the outer layer is generally a higher melting and less modified polyester such as poly (ethylene terephthalate), poly(ethylene terephthalate) copolyesters containing about 1 to about 20 mol % of other glycols, poly(1,4-cyclohexylene dimethylene) terephthalate, or poly(1,4-cyclohexylene dimethylene terephthalate) copolyesters containing about 1 to about 20 mol % of other glycols and the like. When tin coated steel is used as the metal substrate, it is important that the inner layer of polyester be applied at a temperature of less than about 230° C. to avoid the melting of the tin coating.

It is preferred that the polyester coatings be extruded onto the preheated metal sheeting in a vertical direction as indicated in FIG. 1. The polyester resins are extruded through a feedblock and cast film die onto the heated metal sheeting just prior to the nip roll. If two layers of polyester are applied, two extruders are required to feed the separate molten streams to the feedblock.

As the laminate exits the nip, it is heated by means of infrared or induction heating methods or passed through a heated oven and then through a second set of nip rolls to ensure that good, intimate contact is made with the metal and to provide a uniform thin coating of polyester. When two layers of polyester are used on each side of the metal, the inner layer is usually thinner than the outer layer.

The laminates are optionally quenched (usually in water) to a temperature below the glass transition temperature of the polyesters to ensure that the polyester coatings are in an amorphous state. Can blanks cut from the laminates are readily drawn and wall ironed or drawn and redrawn into cans.

Although not required, branching agents such as pyromellitic dianhydride, trimellitic anhydride or acid, trimethylolpropane, pentaerythritol and the like may be added to the polymer melt in the extruder to increase the melt viscosity and melt strength of the polyester before being extrusion coated onto the metal.

The polyester compositions described in this invention may contain additives generally known in the art. These include nucleation or crystallization aids, surface lubricants, denesting agents, stabilizers, antioxidants, ultraviolet light absorbing agents, pigments, colorants, and the like. The polyesters may also contain carbon black and/or black iron oxide. Generally the exterior polyester layer will contain pigments such as $TiO_2$ for printing and decoration purposes.

In addition to the coating of metal can sheeting, it is also possible to laminate the copolyesters of the present invention to aluminum or tin foil for subsequent use in food pouches, such as for potato chips, cookies, and the like. The coating on the foil makes it possible to heat seal the packages. As in the beverage/food can application, the exterior layers of the food pouch laminates generally contain pigments such as $TiO_2$ for printing and decoration purposes.

The following examples will further illustrate the invention.

EXAMPLE 1

Electrolytically chromium coated steel having a thickness of 0.3 mm is fed from a roll vertically downward and heated by means of gas flames to a temperature of 280° C. This heated metal sheeting is fed to a set of nip rolls at a speed of 100 ft/min. Poly(ethylene terephthalate) copolyester containing 18 mol % diethylene glycol and having an inherent viscosity of 0.85 dL/g is extrusion coated onto both sides of the heated metal sheeting just prior to the point at which the metal reaches the nip (see FIG. 1). This extrusion coating is accomplished by feeding ⅛ inch pellets of copolyester through an extruder having a 1 inch diameter, a single flight screw, and L/D ratio of 28/1. Copolyester melt is extruded through a feedblock and a 6 inch wide die having an opening of 15 mil at a melt temperature of 300° C. After passing through the nip, the metal sheeting has a 0.6 mil coating of copolyester on each side. The copolyester/metal/copolyester laminate is passed through an oven maintained at 250° C. and then through another set of nip rolls to ensure that good adhesion is obtained. The laminate is then passed through a quench bath filled with chilled water to maintain the copolyester coating in an amorphous state.

Can blanks are diced from the laminated sheeting and cans are readily prepared by the draw and redraw process or drawn and wall-ironed process. The cans have a good appearance and there are no cracks in the copolyester coating.

Similarly good results are achieved when the copolyester is pigmented with 10% $TiO_2$. Coated cans from this composition have a nice white appearance which can be printed to provide decoration or descriptive material.

EXAMPLE 2

The procedure of Example 1 is repeated except that two extruders are used on each side of the heated metal sheeting to provide a coextruded polyester coating 1 mil thick on each side of the metal. The inner layer of polyester is a poly (ethylene terephthalate) copolyester containing 29 mol % diethylene glycol (I.V. 0.82 dL/g) applied at a melt temperature of 300° C. and the outer layer is poly(ethylene terephthalate) (I.V. 0.85 dL/g) applied at a melt temperature of 305° C.

Can blanks are diced from the laminated sheeting and cans are readily prepared by the draw/redraw process.

EXAMPLE 3

The procedure of Example 1 is repeated except that aluminum sheeting (0.2 mm thickness) is used instead of the chromium coated steel. The copolyester coating has a good appearance. Can blanks diced from this laminate are readily converted into cans by the draw and wall-ironed process.

EXAMPLE 4

The procedure of Example 2 is repeated except that aluminum sheeting (0.2 mm thickness) is used instead of the chromium coated steel and coextruded layers of poly (ethylene 2,6-naphthalenedicarboxylate) copolyester containing 32 mol % diethylene glycol (I.V. 0.87 dL/g) and poly(ethylene 2,6-naphthalenedicarboxylate) containing 25 mol % 1,4-cyclohexanedimethanol (I.V. 0.79 dL/g) are used.

Similarly good results are achieved when the copolyesters contain 7.5% $TiO_2$ pigments.

EXAMPLE 5

The procedure of Example 1 is repeated except the copolyester used is a poly(1,4-cyclohexylenedimethylene terephthalate) containing 19 mol % ethylene glycol and 0.5 mol % 5-sodiosulfoisophthalic acid (I.V. 0.75 dL/g). The coated metal has a good appearance and is readily converted into cans.

EXAMPLE 6

The procedure of Example 1 is repeated except that 0.5 mol % pyromellitic dianhydride branching agent is injected at a midpoint in the extruder into the poly(ethylene-co-diethylene terephthalate) copolyester melt. The coated metal has a good appearance and is readily converted into cans.

We claim:

1. A process for forming a layered structure of metal sheet and polyester comprising
   (A) directing a continuous length run of metal sheet along a path extending in a downward, generally vertical direction,
   (B) coating at least one side of said sheet with a layer of molten polyester having repeat units from a dicarboxylic acid component comprising at least 80 mol % terephthalic acid, naphthalenedicarboxylic acid, 1,4-cyclohexanedicarboxylic acid or mixtures thereof and repeat units from a glycol component comprising about 0–30 mol % diethylene glycol, 10–60 mol % 1,4-cyclohexanedimethanol and about 10–90 mol % ethylene glycol,
   (C) prior to the coating step (B), heating said metal sheet to a temperature of about 150° C. to about 350° C.,
   (D) immediately following the coating step (B), passing the coated metal sheet through a pair of cooperating nip rolls adjusted to firmly press said polyester into contact with said metal sheet, and
   (E) following step (D), optionally quenching said layered structure to a temperature below the glass transition temperature of the polyester to thereby ensure that the polyester coating is in an amorphous state.

2. A process according to claim 1 comprising coating both sides of said metal sheet in step (B).

3. A process according to claim 1 which includes, immediately after step (D), the steps of (F) heating the coated sheet to a temperature such that the coating returns to a temperature of about 150° C. to about 350° C., and (G) following step (F) and prior to step (E), passing said coated sheet through a pair of cooperating nip rolls adjusted to firmly press said polyester into contact with said metal sheet.

4. Process according to claim 1 wherein said polyester coatings(s) has a thickness of about 0.5 to about 3.0 mils.

5. Process according to claim 1 wherein said polyester coating(s) has a thickness of about 0.5 to about 3.0 mils and said metal sheet has a thickness of about 0.02 to about 0.5 mm.

6. Process according to claim 1 wherein step (B) includes coextruding at least two layers of polyester on at least one side of said metal sheet.

7. Process according to claim 1 wherein said polyester has repeat units from said dicarboxylic acid component comprising about 80–100 mol % terephthalic acid and repeat units from said glycol component comprising about 10–20 mol % diethylene glycol, 20–50 mol % 1,4-cyclohexanedimethanol and about 30–70 mol % ethylene glycol.

8. Process according to claim 1 wherein said polyester has repeat units from said dicarboxylic acid component comprising about 95–99.5 mol % terephthalic acid and about 5–0.5 mol % 5-sodiosulfoisophthalic acid.

\* \* \* \* \*